United States Patent [19]

Kataoka et al.

[11] Patent Number: 4,786,481

[45] Date of Patent: Nov. 22, 1988

[54] METHOD FOR ELUTING A METAL ADSORBED ON A CHELATING AGENT

[75] Inventors: Yushin Kataoka; Masaaki Matsuda; Masahiro Aoi, all of Niihama, Japan

[73] Assignee: Sumitomo Chemical Company, Limited, Osaka, Japan

[21] Appl. No.: 759,104

[22] Filed: Jul. 25, 1985

[30] Foreign Application Priority Data

Aug. 3, 1984 [JP] Japan .................................. 59-164021

[51] Int. Cl.$^4$ ....................... C01G 43/00; C01G 7/00; C01G 15/00; C01G 17/00; C01G 55/00

[52] U.S. Cl. ......................................... 423/7; 423/22; 423/24; 423/98; 423/112

[58] Field of Search ................. 423/7, 22, 24, 56, 112, 423/98

[56] References Cited

U.S. PATENT DOCUMENTS

| | | | |
|---|---|---|---|
| 3,883,490 | 5/1975 | Fujimoto et al. | 260/79.5 NV |
| 3,892,688 | 7/1975 | Motani et al. | 423/22 |
| 3,892,689 | 7/1975 | Motani et al. | 260/22 R |
| 3,998,924 | 12/1976 | Jones et al. | 423/7 |
| 4,233,272 | 11/1980 | Eresen et al. | 423/7 |
| 4,439,433 | 3/1984 | Heymes | 424/246 |
| 4,468,374 | 8/1984 | Kataoka et al. | 423/112 |
| 4,564,659 | 1/1986 | Kataoka et al. | 525/328 |
| 4,565,673 | 1/1986 | Kataoka et al. | 423/24 |
| 4,605,706 | 8/1986 | Kataoka et al. | 525/340 |

OTHER PUBLICATIONS

Grant, "Hackh's Chemical Dictionary", 4th Ed., p. 646, McGraw-Hill Book Co. (1972) New York.

Primary Examiner—Edward A. Miller
Attorney, Agent, or Firm—Stevens, Davis, Miller & Mosher

[57] ABSTRACT

A method for eluting a metal adsorbed on a chelating agent with an eluent, which comprises using as the eluent an aqueous solution containing a water-soluble inorganic sulfide and a basic compound at concentrations of 0.005 to 3N and 0.1N or more, respectively.

4 Claims, No Drawings

METHOD FOR ELUTING A METAL ADSORBED ON A CHELATING AGENT

BACKGROUND OF THE INVENTION

1. Field of the Invention

This invention relates to a method for eluting a metal adsorbed on a chelating agent, more particularly a method for eluting a metal from a chelating agent having adsorbed the metal by using as an eluent an aqueous base solution containing a sulfide.

2. Description of the Prior Art

Elution of a metal adsorbed on a chelating agent has heretofore been conducted generally by bringing a chelating agent having adsorbed the metal into contact with an aqueous solution of a mineral acid such as sulfuric acid, hydrochloric acid or the like. However, in the case of employing such a method, when the chelating agent has a functional group having no acid resistance such as an oxime group, a phosphoric ester group or the like, it is deteriorated in capability by decomposition of the functional group. Therefore, the employment thereof is not desirable.

For eluting a metal such as mercury, cadmium, copper, zinc, lead, tin, gold, silver or the like, for example, from a chelating agent having a special functional group of sulfur series possessing a high bonding strength to heavy metals such as —SH, >C=S or the like, there is also known an elution method using an aqueous sulfide solution (Japanese Patent Publication Nos 28,274/76 and 35,399/76).

However, in general, employment of an aqueous sulfide solution as an eluent is diadvantageous, for example, in that elution requires a very long time; that since metal sulfides are generally low in solubility, eluted metal is deposited as a sulfide, so that for recovering the metal, a troublesome step of dissolving and recovering the metal again is needed; and that the eluted metal is precipitated as a metal sulfide which is slightly soluble in water, therefore when a solid adsorbent is used, the metal sulfide is accumulated in the adsorbent, so that the pores are clogged therewith, resulting in deterioration of the adsorbent in capability.

In consideration of these circumstances, in order to develop a method for eluting a metal adsorbed on a chelating agent which is free from the disadvantages described above, the present inventors have conducted research and have consequently found that by using as an eluent an aqueous base solution containing a specified amount of a sulfide, the metal can be recovered in a liquid state to a high concentration range with a high elution rate without essentially causing deterioration of the adsorbent, whereby this invention has been accomplished.

SUMMARY OF THE INVENTION

The object of this invention is to provide a method for eluting a metal adsorbed on a chelating agent with an eluent, which comprises using as the eluent an aqueous solution containing a water-soluble inorganic sulfide and a basic compound at concentrations of 0.005 to 3N and 0.1N or more, respectively.

DETAILED DESCRIPTION OF THE INVENTION

Although the chelating agent which the method of this invention is intended for is not critical and said method is applicable to any chelating agent, said method is suitable particularly for chelating agents having in the molecule at least one functional group or metal salt thereof selected from the group consisting of —P(OR)$_2$, —PO(OR)$_2$, —PH(OR)$_3$, =NOH, —N(R)$_2$, —$\oplus$N(R)$_3$ (wherein each of R's which may be the same or different represents hydrogen, is a phenyl group, an alkyl group or an alkenyl group) and their metal salts.

Chelating agents suitably used in the above-mentioned method of this invention are those which are relatively stable under basic conditions but unstable under acidic conditions, and they include, in general, (1) chelate resin obtained by reacting a polymer of a vinyl cyanide type monomer such as acrylonitrile, α-chloroacrylonitrile, vinylidene cyanide, methacrylonitrile or the like or a copolymer of said monomer and an ethylene type unsaturated monomer copolymerizable therewith, with hydroxylamine or a derivative thereof to introduce amidoxim group into the polymer or copolymer, (2) resins obtained by polymerizing a vinyl cyanide type derivative prepared by reacting a vinyl cyanide type monomer such as acrylonitrile, α-chloroacrylonitrile, vinylidene cyanide, methacrylonitrile or the like with hydroxylamine or a hydroxylamine derivative, or by copolymerizing the vinyl cyanide type derivative with an ethylene type unsaturated monomer copolymerizable therewith, (3) chelate resins having phosphine group or phosphonium salt group obtained by reacting a polymer such as styrene-divinylbenzene copolymer, phenol resin, polyethylene, polypropylene or the like containing a halogenated alkyl group, e.g., chloromethyl group, bromomethyl group or the like or a halogen atom such as bromine, iodine or the like, with a phosphine compound such as lithium diphenylphosphine, sodium diphenylphosphine, lithium phenylphosphine, tricresylphosphine or the like or a mixture thereof, (4) chelate resins having a phosphonic acid ester group obtained by reacting a styrene-divinylbenzene copolymer, phenol resin, aniline resin or m-phenylene polymer containing a halogenated alkyl group, e.g., chloromethyl group, bromomethyl group or the like (hereinafter referred to as "the resins having a halogenated alkyl group") with a phosphorous acid derivative such as triethyl phosphite, triphenyl phosphite, trimethyl phosphite or the like or a mixture thereof (hereinafter referred to as "the phosphorous acid derivatives"), (5) chelate resins having an aminoalkylenephosphoric acid ester group obtained by reacting a resin having primary or secondary amino group with a halogenated alkylphosphoric acid ester such as diethyl chloromethylphosphonate, ethyl chloromethylphosphonate, diphenyl chloromethylphosphonate, dicresyl chloromethylphosphonate, ethyl chloromethylphosphinate or the like or a mixture thereof, (6) chelate resins having an aminoalkylenephosphoric acid group obtained by hydrolyzing the above-mentioned chelate resin having an aminoalkylenephosphoric acid ester group, or by carrying out reaction in the same manner as in the production of the above-mentioned resins having an aminoalkylenephospharic acid ester group, except that the phosphorous acid derivative used in said production is replaced by phosphorous acid, (7) chelate resins having tertiary or quaternary amino group obtained by reacting a styrene-divinylbenzene copolymer having a halogenated alkyl group, e.g., chloromethyl group, bromomethyl group or the like or a halogen atom, e.g., bromine, iodine or the like with dimethylamine, diethylamine, trimethylamine, triethylamine, dimethylethanolamine or the like, and (8) other various slightly water-soluble chelating agents such as dibutylphosphoric acid esters, 2-ethylhexylphenylphosphonic acid esters, dibutyl[(diethyl-carbamoyl)methyl]phosphonic acid esters, di-(2-ethylhexyl)-phosphoric acid esters, 2-ethylhexylisobutyldiophoshoric acid, 4-nonylsalicylaldoxime, o-hydroxy-p-nonyl-acetophenoneoxime, laurylamidoxime, 4-octylbenzamidoxime and the like.

In the chelating agent in this invention, the metal salts is one which is formed by ionic bond, chelate bond or complex bond between the functional group in the chelating agent and the metal, and the metal is not critical so long as these bonding strengths for the formation of the salt are lower than the bonding strength between the aforesaid functional group and a metal intended to be adsorbed and recovered.

As a metal for forming such a metal salt, there may generally be exemplified alkali metals and alkaline earth metals such as sodium, potassium, calcium, magnesium and the like.

In the chelate resin having adsorbed a metal used in this invention, the metal may be adsorbed by any method. Although the kind of the adsorbed metal is not critical, preferable are metals soluble in eluents comprising a mixed aqueous solution of a sulfide and a basic compound, for example, gallium, germanium, indium, uranium, vanadium, gold, platinum, palladium, thallium, etc.

In practicing the method of this invention, there is used as the eluent an aqueous solution containing a water-soluble inorganic sulfide and a basic compound in concentrations of 0.005 to 3N, preferably 0.01 to 2N, and 0.1N or more, preferably 0.2 to 25N, respectively.

When an aqueous base solution having a sulfide concentration of less than 0.005N is used as the eluent, elution of the metal does not occur substantially, or it is low in rate and hence requires a long time. On the other hand, when the sulfide concentration exceeds 3N, an effect proportional thereto is difficult to obtain, and the metal eluted is deposited. Even in the case of the sulfide concentration being 0.005 to 3N, when the concentration of the base is less than 0.1N, the elution rate of the metal is low, so that the elution requires a long time, and moreover the pores of the adsorbent are clogged with the metal sulfide eluted, resulting in deterioration in capability of the adsorbent. Therefore, such a base concentration is not desirable. The upper limit of the concentration of the basic compound is not critical, and it may be any concentration so long as the basic compound is dissolved in an eluent.

Accordingly, by combination of a sulfide of a specified concentration and an aqueous base solution of a specified concentration, there can be obtained an eluent which makes it possible to attain a desired elution rate and recover a metal in a liquid state, and causes no substantial deterioration of the adsorbent.

The sulfide which is a constituent of the eluent used in the method of this invention include water-soluble inorganic sulfides such as sodium sulfide, ammonium sulfide, hydrogen sulfide, potassium sulfide, ammonium hydrogensulfide, sodium hydrogensulfide, lithium sulfide, barium sulfide, magnesium sulfide and the like.

The basic compound which is another constituent of said eluent includes inorganic alkali compounds such as sodium hydroxide, potassium hydroxide, calcium hydroxide, magnesium hydroxide, ammonia and the like, and water-soluble organic amines such as ethylenediamine, diethylenetriamine, diethylamine, triethylamine and the like. Such sulfide and basic compound are mixed and used in the form of an aqueous solution.

Although in principle, the eluent is used, as described above, in the form of an aqueous solution of the constituents, it may contain organic solvents, so long as the contact treatment is not hindered.

Although the amount of the eluent used is not critical and varies depending on the kind and concentration of the eluent, the kind of chelating agent, the kind and content of adsorbed metal, and the like, it can be determined by carrying out preliminary tests properly.

Although the temperature at contact of the chelating agent having adsorbed a metal with the eluent is not critical, it is usually 0° to 100° C., preferably 10° to 50° C.

The contact time is also not critical. It is, however, usually 1 minute to 24 hours.

A method for the contact is not critical, and there is employed, for example, a method comprising passing an eluent through a column packed with a resinous chelating agent; a method comprising immersing a resinous chelating agent in an eluent, and then separating them by filtration; a method comprising adding a liquid chelating agent to an eluent, contacting and stirring them, and separating them by allowing the resulting mixture to stand; or the like.

From a liquid containing the metal eluted (hereinafter abbreviated as "the eluate"), the metal can be recovered in the form of a metal hydroxide by carrying out treatments such as neutralization, filtration and the like, or can be recovered by subjecting the eluate as it is to treatment with a reducing agent, electrolysis and the like, though a method for recovering the metal varies depending on the kind and use of the metal.

The chelating agent from which the metal ions have been eluted can be reused as an adsorbing and capturing agent for metal ions as it is or after, if necessary, being treated with water and/or a basic aqueous solution of sodium hydroxide, potassium hydroxide, calcium hydroxide, magnesium hydroxide, ammonia or the like, or an acidic aqueous solution of hydrochloric acid, sulfuric acid, nitric acid, phosphoric acid or the like.

According to the method of this invention described above in detail, as to a chelating agent having adsorbed a metal and containing a functional group which is subject to hydrolysis under acidic condition, it has become possible to suppress decomposition of the easily hydrolyzable functional group at the time of elution, and it has consequently become possible to separate a metal from a chelating agent having a readily hydrolyzable functional group.

Further, employment of the eluent of this invention brings about the following marked industrial effects: the elution rate is greatly increased, recovery of a metal in a liquid state to a high concentration range is made possible, and deterioration of adsorbent is greatly reduced. Therefore, its industrial significance is very large.

This invention is further explained below in more detail referring to examples, which are not by way of limitation but by way of illustration within the scope of the gist of this invention.

EXAMPLES 1 to 3 AND COMPARATIVE EXAMPLES 1 TO 5

A column having an inside diameter of 20 mm was packed with 100 ml of Sumichelate ®MC-60 (a chelating agent having amidoxime group, manufactured by Sumitomo Chemical Company), and sea water having a uranium concentration of 3.1 ppb was passed therethrough upward at a space velocity of 50 hr$^{-1}$ for 120 hours to adsorb uranium on the chelating agent.

Subsequently, an eluent having each of the compositions shown in Table 1 was passed downward through the column at a space velocity of 10 hr$^{-1}$ for 3 hours at room temperature to eluate the uranium adsorbed on the chelating agent.

The uranium concentration in the eluates thus obtained were as shown in Table 1.

TABLE 1

|  | Composition of eluent | Uranium concentration in eluent (mg/l) |
| --- | --- | --- |
| Example 1 | 0.01 N Na$_2$S/1 N NaOH | 0.57 |
| Example 2 | 0.1 N Na$_2$S/0.5 N NaOH | 0.62 |
| Example 3 | 1 N Na$_2$S/1 N NaOH | 0.63 |
| Comparative Example 1 | 0.1 N Na$_2$S | 0.08 |
| Comparative Example 2 | 1 N Na$_2$S | 0.12 |
| Comparative Example 3 | 0.5 NaOH | 0.00 |
| Comparative Example 4 | 1 N NaOH | 0.00 |
| Comparative Example 5 | 0.1 N Na$_2$S/0.05 NaOH | 0.14 |

EXAMPLES 4 AND 6 AND COMPARATIVE EXAMPLES 6 TO 12

A column having an inside diameter of 20 mm was packed with 100 ml of Duolite ®CS-346 (a chelating agent having amidoxime group, manufactured by Diamond Shamrock Company), and sea water having a uranium concentration of 3.1 ppb was passed therethrough upward at a space velocity of 50 hr$^{-1}$ for 120 hours to adsorb uranium on the chelating agent. Subsequently, an eluent having each of the compositions shown in Table 2 was passed downward at a space velocity of 10 hr$^{-1}$ for 3 hours at room temperature to elute the uranium adsorbed on the chelating agent. Next, deionized water was passed upward through the column at a space velocity of 10 hr$^{-1}$ for 1 hour to wash the chelating agent.

After passage of the sea water and elution were repeated predetermined times in the same manner as described above, the amount of uranium adsorbed on the chelating agent was measured to obtain the results shown in Table 2.

TABLE 2

|  | Number or repetitions of adsorption and elution | Composition of eluent | Amount of uranium adsorbed (mg) |
| --- | --- | --- | --- |
| Example | | | |
| 4 | 10 times | 0.1 N Na$_2$S/0.5 N NaOH aq. solution | 1.17 |
| 5 | 20 | 0.1 N Na$_2$S/0.5 N NaOH aq. solution | 1.12 |
| 6 | 50 | 0.1 N Na$_2$S/0.5 N NaOH aq. solution | 1.08 |
| Comparative Example | | | |
| 6 | 10 | 0.5 N HCl aq. solution | 0.51 |

TABLE 2-continued

|  | Number or repetitions of adsorption and elution | Composition of eluent | Amount of uranium adsorbed (mg) |
| --- | --- | --- | --- |
| 7 | 20 | 0.5 N HCl aq. solution | 0.42 |
| 8 | 30 | 0.5 N HCl aq. solution | 0.32 |
| 9 | 10 | 0.1 N Na$_2$S | 0.21 |
| 10 | 20 | 0.1 N Na$_2$S | 0.13 |
| 11 | 10 | 0.5 N NaOH | 0.00 |
| 12 | 20 | 0.5 N NaOH | 0.00 |

EXAMPLE 7

A column having an inside diameter of 10 mm was packed with 100 ml of a resinous chelating agent having =NOH group, =NH group, —NH$_2$ group and —NHNH$_2$ group prepared by reacting a copolymer of acrylonitrile and divinylbenzene with hydroxylamine sulfate and hydrazine an aqueous solution, and 3,000 ml of Bayer solution having a gallium concentration of 180 ppm and containing 18% by weight NaOH was passed therethrough for 3 hours to adsorb gallium on the chelating agent. Next, 200 ml of water was passed downward through the column, and then 2,000 ml of a mixed aqueous solution of sodium hydrosulfide and sodium hydroxide at concentrations of 0.5N and 2N, respectively, was passed therethrough at room temperature over a period of 1 hour to elute the gallium adsorbed on the chelating agent. Subsequently, the chelating agent was washed with 200 ml of deionized water, after which passage of the gallium-containing liquid, and elution and reclamation were repeated 20 times to find that the gallium adsorption percentage at the 20-th adsorption was 97%, taking that at the first adsorption as 100.

COMPARATIVE EXAMPLES 13 AND 14

Passage of the gallium-containing liquid, and elution and reclamation were repeated in exactly the same manner as described above, except that the eluent used in Example 7 was replaced by a 0.5N aqueous sodium hydrosulfide solution or a 2N aqueous sodium hydroxide solution, to find that the gallium adsorption percentages at the 20-th adsorption were 37% and 0%, respectively, taking that at the first adsorption as 100.

EXAMPLES 8 TO 21 AND COMPARATIVE EXAMPLES 15 TO 28

After 5 ml of each of the following chelating agents A to N was brought into contact with 100 ml of uranium-enriched sea water containing 100 mg/liter of uranium and having a pH of 8.3 for 3 hours, it was filtered and the residue was washed with water to obtain each chelating agent having adsorbed uranium. The amounts of uranium adsorbed of the chelating agents are shown in Table 3.

After each chelating agent having adsorbed uranium was mixed with 50 ml of the eluent shown in Table 3 and subjected to contact treatment for 3 hours, the amounts of uranium eluted of the chelating agents were as shown in Table 3.

Chelating agent A

A resin having an aminoalkylenephosphoric acid ester group obtained by reacting 60 parts by weight of polyacrylonitrile with 103 parts by weight of diethylenetriamine in an aqueous solvent, and further reacting the resulting aminated polyacrylonitrile with 281 parts by weight of an aqueous formaldehyde solution and 498 parts by weight of triethyl phosphite in the presence of 36% hydrochloric acid.

Chelating agent B

A resin having a quaternary phosphonium salt group obtained by reacting 200 parts by weight of chloromethylated polystyrene with 200 parts by weight of tributylphosphine in dimethylformamide solvent.

Chelating agent C

A resin having a quaternary phosphonium salt group obtained by reacting 200 parts by weight of chloromethylated polystyrene with 260 parts by weight of triphenylphosphine in dimethylformamide solvent.

Chelating agent D

A resin having a phosphine group obtained by reacting 150 parts by weight of brominated polystyrene with 64 parts by weight of a 1.6 mole % solution of n-butyllithium dissolved in hexane in tetrahydrofuran solvent, reacting the resulting lithium polystyrene with 300 parts by weight of chlorodiphenylphosphine in tetrahydrofuran solvent, and then oxidizing the resulting reaction product with 371 parts by weight of 40% peracetic acid in methylene chloride solvent.

Chelating agent E

A resin having sodium salt of phosphonic acid obtained by hydrolyzing Chelate resin B in a 20% aqueous sodium hydroxide solution.

Chelating agent F

A resin having phosphinic acid group obtained by reacting 100 parts by weight of polystyrene with 150 parts of phosphorus trichloride in chloroform solvent, and then hydrolyzing the reaction product.

Chelating agent G

A resin having a phosphinic acid ester group obtained by reacting 100 parts by weight of aminated polystyrene with 120 parts by weight of cresyl chloromethylphosphinate in 1,2-dichloroethane solvent.

Chelating agent H

A resin having diethylenetriaminomethylenephosphoric acid group obtained by hydrolyzing Chelating resin A in a 2-% aqueous sodium hydroxide solution.

Chelating agent I

A resin obtained by reacting 1,2-benzisoxazole-3-acetamidoxime with resorcin and formalin.

Chelating agent J

A vinyldiamidodioxime-divinylbenzene-acrylic acid copolymer resin obtained by reacting a copolymer of vinylidene cyanide, divinylbenzene and methyl acrylate with hydroxylamine.

Chelating agent K

Sumichelate ®MC-30 (a chelating agent having an iminodiacetic acid group, manufactured by Sumitomo Chemical Company).

Chelating agent L

A 2-ethylhexyl-phenylphosphonic acid ester

Chelating agent M

A dibutyl[(diethylcarbamoyl)methyl]phosphonic acid ester

Chelating agent N

4-Dodecylbenzylaminomethylenephosphonic acid

TABLE 3

| | Chelating agent | Composition of eluent | Amount of uranium adsorbed (mg) | Amount of uranium eluted (mg) |
|---|---|---|---|---|
| Example | | | | |
| 8 | Chelating agent A | 0.5 N $(NH_4)_2S$/1 N KOH aq. solution | 9.7 | 9.7 |
| 9 | Chelating agent B | 0.5 N $(NH_4)_2S$/1 N KOH aq. solution | 8.9 | 8.9 |
| 10 | Chelating agent C | 0.5 N $(NH_4)_2S$/1 N KOH aq. solution | 8.9 | 8.9 |
| 11 | Chelating agent D | 0.1 N $Na_2S$/1 N $NH_3$ | 9.1 | 9.1 |
| 12 | Chelating agent E | 0.1 N $Na_2S$/1 N $NH_3$ | 8.8 | 8.7 |
| 13 | Chelating agent F | 1 N—$Na_2S$/2 N diethyltriamine | 8.6 | 8.6 |
| 14 | Chelating agent G | 0.25 N NaHS/0.5 N NaOH | 8.9 | 8.8 |
| 15 | Chelating agent H | 0.25 N NaHS/0.5 N NaOH | 9.9 | 9.9 |
| 16 | Chelating agent I | 0.25 N NaHS/0.5 N NaOH | 6.7 | 6.7 |
| 17 | Chelating agent J | 0.1 N $K_2S$/3 N KOH | 7.4 | 7.4 |
| 18 | Chelating agent K | 0.5 N $(NH_4)_2S$/3 N NaOH | 3.2 | 3.2 |
| 19 | Chelating agent L | 0.5 N $Na_2S$/4 N NaOH | 7.9 | 7.9 |
| 20 | Chelating agent M | 0.5 N $Na_2S$/4 N NaOH | 8.7 | 8.7 |
| 21 | Chelating agent N | 0.5 N $Na_2S$/4 N NaOH | 9.3 | 9.2 |
| Comparative Example | | | | |
| 15 | Chelating | 1 N—NaOH | 9.7 | 0.0 |

TABLE 3-continued

|  | Chelating agent | Composition of eluent | Amount of uranium adsorbed (mg) | Amount of uranium eluted (mg) |
| --- | --- | --- | --- | --- |
| 16 | Chelating agent B | 1 N—KOH | 8.9 | 0.0 |
| 17 | Chelating agent C | 1 N—NH$_3$ | 8.9 | 0.7 |
| 18 | Chelating agent D | 1 N NaHS/0.05 N NaOH | 9.1 | 1.7 |
| 19 | Chelating agent E | 1 N Na$_2$S/0.08 N NaOH | 8.8 | 2.4 |
| 20 | Chelating agent F | 1 N (NH$_4$)$_2$S/0.08 N NH$_3$ | 8.6 | 2.6 |
| 21 | Chelating agent G | 7 N K$_2$S/0.08 N KOH | 8.9 | 2.2 |
| 22 | Chelating agent H | 0.1 N (NH$_4$)$_2$S | 9.9 | 0.0 |
| 23 | Chelating agent I | 1.3 N Na$_2$S/0.08 N NaOH | 6.7 | 3.7 |
| 24 | Chelating agent J | 1 N KHS/0.08 N Mg(OH)$_2$ | 7.4 | 3.5 |
| 25 | Chelating agent K | 1 N KHS/0.05 N NH$_3$ | 3.2 | 1.7 |
| 26 | Chelating agent L | 1 N (NH$_4$)$_2$S/0.08 N Ca(OH)$_2$ | 7.9 | 3.7 |
| 27 | Chelating agent M | 0.5 N Na$_2$S/0.05 N NaOH | 8.7 | 1.8 |
| 28 | Chelating agent N | 0.5 N Na$_2$S/0.04 N NaOH | 9.3 | 1.2 |

EXAMPLE 22

When 100 ml of Duolite ® ES-467 (a chelating agent having aminomethylenephosphonic acid group, manufactured by Diamond Shamrock Company) was shaked together with 300 ml of an aqueous solution containing 1,300 mg/liter of indium and having a pH of 0.7 for 7 hours to be subjected to contact treatment, 3,870 mg of indium was adsorbed by the chelating agent.

When this chelating agent having adsorbed indium was packed into a column having an inside diameter of 12 mm and 700 ml of a mixed aqueous solution of 0.02 N sodium sulfide and 2 N sodium hydroxide was passed through the column over a period of 3 hours at room temperature, 3,861 mg of indium was eluted.

COMPARATIVE EXAMPLE 29

Adsorption and elution of indium were conducted in exactly the same manner as in Example 22, except that a 4 N aqueous sulfuric acid solution was used in place of the eluent used in Example 22, to find that the amount of indium adsorbed was 3,879 mg, while the amount of indium eluted was 38 mg.

EXAMPLE 23

When 10 ml of Duolite ® A-161 (a strongly basic ion-exchange resin having a quaternary ammonium salt, manufactured by Diamond Shamrock Company) was shaked together with 100 ml of a gold plating waste solution containing 1,070 mg/liter of gold and having a pH of 11 for 20 hours to be subjected to contact treatment, 98 mg of gold was adsorbed by the ion-exchange resin.

This ion-exchange resin having adsorbed gold was added to 500 ml of a 2 N aqueous potassium hydroxide solution, and 30 liters of hydrogen sulfide gas was bubbled therethrough with stirring at room temperature over a period of 5 hours. When the ion-exchange resin having adsorbed gold was stirred together with this eluent consisting of H$_2$S-KOH mixed aqueous solution for another 19 hours to be brought into contact therewith, 95 mg of gold was eluted.

COMPARATIVE EXAMPLE 30

Adsorption and elution of gold were conducted in exactly the same manner as in Example 23, except for using a 1 N aqueous sulfuric acid solution in place of the eluent used in Example 23 and changing the stirring and contact time to 24 hours, to find that the amount of gold adsorved was 98 mg, while the amount of gold eluted was 0.9 mg.

EXAMPLES 24 to 26 AND COMPARATIVE EXAMPLES 31 TO 33

When a column having an inside diameter of 12 mm was packed with 10 ml of each of the chelating agents having adsorbed the respective metals shown in Table 4, and an eluent having each of the compositions shown in Table 4 was passed therethrough downward at a space velocity of 5 hr$^{-1}$ for 6 hours at room temperature to elute the adsorbed metal, the results shown in Table 4 were obtained.

TABLE 4

|  | Chelating agent | Composition of eluent | Adsorbed metal Kind | Adsorbed amount (mg) | Amount of metal eluted (mg) |
| --- | --- | --- | --- | --- | --- |
| Example |  |  |  |  |  |
| 24 | Sumichelate MC-60 | 1 N Na$_2$S/3 N NH$_3$ | Germanium | 23 | 22 |
| 25 | Duolite ES-467 | 1 N (NH$_4$)$_2$S/3 N NaOH | Palladium | 37 | 34 |
| 26 | Duolite A-161 | 1 N Na$_2$S/2 N NaOH | Platinum | 83 | 79 |

TABLE 4-continued

| | Chelating agent | Composition of eluent | Adsorbed metal Kind | Adsorbed amount (mg) | Amount of metal eluted (mg) |
|---|---|---|---|---|---|
| Comparative Example | | | | | |
| 31 | Sumichelate MC-60 | 1 N Na$_2$S | Germanium | 23 | 3 |
| 32 | Duolite ES-467 | 1 N Na$_2$S | Palladium | 37 | 8 |
| 33 | Duolite A-161 | 1 N Na$_2$S | Platinum | 83 | 6 |

What is claimed is:

1. In a method for eluting a metal selected from the group consisting of gallium, palladium, germanium, uranium, gold and platinum adsorbed on a chelate resin having at least one functional group selected from the group consisting of $=NOH$, $-P(OR)_2$, $-P(OR)_2$, $-PH(OR)_3$, $-N(R)_2$ and $-NR^+_3$, wherein R may be the same or different and represents hydrogen, phenyl, alkyl or alkenyl, with an eluant, the improvement comprising using as the eluant an aqueous solution containing:

(a) a water soluble inorganic sulfide selected from the group consisting of hydrogen sulfide, alkali metal sulfide, alkaline earth metal sulfide, ammonium sulfide, alkali metal hydrogensulfide and ammonium hydrogen-sulfide at concentrations of 0.005 to 3N, and (b) a basic compound selected from the group consisting of an inorganic alkali compound and a water soluble organic amine at concentrations of 0.1N or more.

2. A method for eluting a metal according to claim 1, wherein the water-soluble inorganic sulfide is sodium sulfide, ammonium sulfide, hydrogen sulfide, potassium sulfide, ammonium hydrogensulfide, sodium hydrogensulfide, lithium sulfide, barium sulfide, or magnesium sulfide.

3. A method for eluting a metal according to claim 1 wherein the inorganic alkali compound is sodium hydroxide, potassium hydroxide, calcium hydroxide, magnesium hydroxide, 4. A method for eluting a metal according to claim 1, wherein the water-soluble organic amine is ethylenediamine, diethylenetriamine, diethylamine or triethylamine.

* * * * *